(12) United States Patent
Lazaris et al.

(10) Patent No.: US 6,655,260 B2
(45) Date of Patent: Dec. 2, 2003

(54) BEVERAGE FILTER CARTRIDGE HOLDER (75) Inventors: Nicholas G. Lazaris, Newton, MA (US); Roderick H. Beaulieu, Cumberland, RI (US)

(73) Assignee: Keurig, Incorporated, Wakefield, MA (US)

( * ) Notice: Subject to any disclaimer, the term of this patent is extended or adjusted under 35 U.S.C. 154(b) by 0 days.

(21) Appl. No.: 10/115,456

(22) Filed: Apr. 3, 2002

(65) Prior Publication Data

US 2002/0148356 A1 Oct. 17, 2002

Related U.S. Application Data (60) Provisional application No. 60/283,298, filed on Apr. 11, 2001, and provisional application No. 60/283,283, filed on Apr. 11, 2001.

(51) Int. Cl.⁷ .............................. A47J 31/06; A47J 31/40
(52) U.S. Cl. ........................................ 99/295; 99/302 R
(58) Field of Search .............................. 99/295, 302 R, 99/302 P, 287, 279, 300

(56) References Cited

U.S. PATENT DOCUMENTS

| 5,197,374 A | * | 3/1993 | Fond ............................ 99/295 |
| 5,603,254 A | | 2/1997 | Fond et al. .................... 99/295 |
| 5,794,519 A | * | 8/1998 | Fischer ......................... 99/295 |
| 5,840,189 A | * | 11/1998 | Sylvan et al. ............. 99/295 X |
| 6,026,732 A | | 2/2000 | Kollep et al. ................. 99/295 |

* cited by examiner

Primary Examiner—Reginald L. Alexander
(74) Attorney, Agent, or Firm—Samuels, Gauthier & Stevens (57) ABSTRACT

A brewer operates during a brew cycle to brew a beverage by infusing heated liquid with a dry beverage medium contained in a single serve disposable cartridge. During the brew cycle, the cartridge is contained in a cup-shaped housing closed by a lid. Rotation of the cartridge within the housing is resisted by locating surfaces arranged to interengage with at least one surface irregularity in the cartridge sidewall. Inlet and outlet probes pierce the cartridge and serve, respectively, to admit the heated liquid and to remove the served beverage.

6 Claims, 9 Drawing Sheets

BEVERAGE FILTER CARTRIDGE HOLDER

CROSS REFERENCE TO RELATED APPLICATIONS

This application claims priority of provisional patent application Serial No. 60/283,298 filed Apr. 11, 2001, and provisional patent application Serial No. 60/283,283 filed Apr. 11, 2001.

The subject matter of this application is generally related to those of U.S. Pat. No. 6,079,315 (Beaulieu et al.) entitled Beverage Filter Cartridge Holder; U.S. Pat. No. 5,840,189 (Sylvan et al.) entitled Beverage Filter Cartridge; application Ser. No. 09/782,622 filed Feb. 13, 2001 (Sweeney et al.) entitled Beverage Filter Cartridge; and application Ser. No. 09/782,660 filed Feb. 13, 2001 (Lazaris et al.) entitled Disposable Single Serve Beverage Filter Cartridge, the disclosures of each of which are herein incorporated by reference.

BACKGROUND DISCUSSION

1. Field of the Invention

This invention relates generally to brewers designed to produce single beverage servings by injecting heated liquid into disposable cartridges containing a dry beverage medium, and is concerned in particular with an improved beverage filter cartridge holder for such brewers.

2. Description of the Prior Art

Known beverage filter cartridges and cartridge holders are described in the above-referenced U.S. patents. The cartridge side walls are generally frustum-shaped and smooth and as such, do not provide a means of rotatably fixing and preferably also orienting the cartridges within the holders. This complicates and largely frustrates efforts to mark the cartridge side walls with coded indicia that can be reliably observed and interpreted by machine readers positioned within the brewers. Such indicia can be usefully processed by control systems designed, for example, to vary the amount and/or flow rate of liquid being dispensed, depending on the type of beverage medium being brewed.

More recently developed cartridges of the type disclosed for example in the above-referenced patent applications include side walls with surface irregularities that can be mechanically engaged to rotatably immobilize and orientate the cartridges within the holders.

SUMMARY OF THE INVENTION

The principal objective of the present invention is the provision of a cartridge holder having internal surfaces or components configured and arranged to coact in mechanical interengagement with surface irregularities in the cartridge side walls to rotatably fix the cartridges within the holder.

A companion objective of the present invention is to also achieve a predetermined and repeatable orientation of the cartridges within the holders.

The holder of the present invention is designed for use in an apparatus for brewing a beverage by infusing heated liquid with a beverage medium contained in a single serve disposable cartridge. In one embodiment of the present invention, the holder is configured for use within a cartridge having an inverted frustum-shaped side wall specially contoured to provide at least one and preferably a plurality of strategically placed surface irregularities. The cartridge is removably received in a cup-shaped housing having a side wall configured and dimensioned to surround the cartridge side wall. Locating elements are arranged to coact with the one or plural surface irregularities in the cartridge side wall to rotatably immobilize the cartridge within the housing. A lid is mounted for manipulation between an open position accommodating insertion and removal of the cartridge, and a closed position confining the cartridge within the housing. Tubular probes associated with the lid and housing are arranged to pierce the thus confined cartridge to thereby accommodate a through flow of heated liquid for infusion with the beverage medium contained in the cartridge.

Preferably, the plural surface irregularities coact with the locating elements to not only rotatably fix the cartridge, but also to achieve a predetermined and repeatable orientation of the cartridge within the housing.

In other embodiments of the present invention the interior surface of the housing is contoured to coact in mechanical interengagement with the surface irregularities in the cartridge side wall.

These and other objectives, features and advantages of the present invention will now be described in greater detail with reference to the accompanying drawings, wherein:

DETAILED DESCRIPTION OF THE INVENTION

Figure 1:
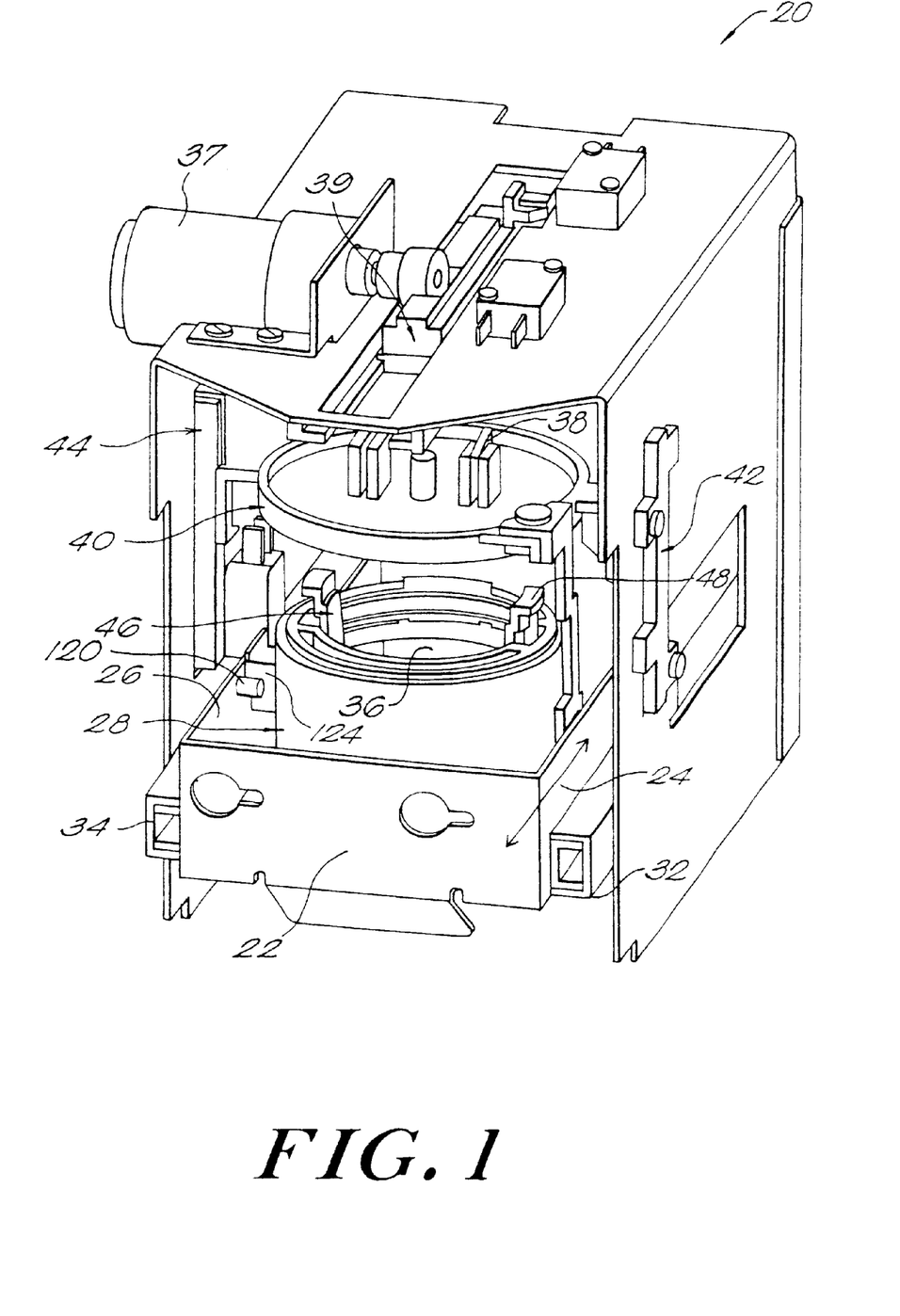
FIG. 1 is a perspective view of a brewing chamber for a single serve beverage brewer embodying a cartridge holder in accordance with one embodiment of the present invention.

With reference initially to FIG. 1, a brewing chamber for a single serve beverage brewer is shown at 20. The brewing chamber 20 includes a slidable drawer 22 comprising side panels 24, 26 that each include a mounting hole (not shown), which serve to pivotally mount the housing 28 of a beverage filter cartridge holder in the slidable drawer 22. The drawer 22 slides horizontally along track assembles 32, 34.

The cartridge holder also includes a vertically moveable lid 40 that is manipulated by a linkage yoke 38 (partially shown), driven by an electric motor 37 through a pinion driven rack 39. The lid 40 is guided along vertical tracks 42, 44 between a raised ready position and a lowered beverage brewing position coacting with the housing. In the ready position, the lid 40 is positioned above and separated from the housing 28, assuming of course that the slidable drawer 22 is in the closed position. The housing 28 defines a chamber 36, and includes cartridge ejection arms 46, 48 that support and position a beverage cartridge within the holder.

Figures 7, 8A:
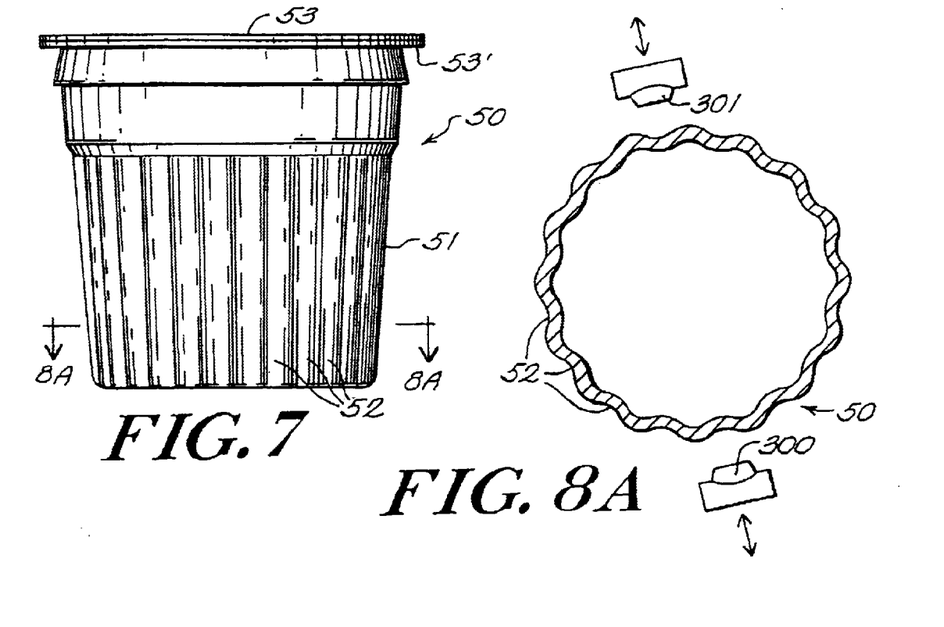
FIG. 7 is a side elevational view of a beverage filter cartridge having surface irregularities in its side wall.
FIG. 8A is a sectional view taken along line 8A—8A of FIG. 7.
Figure 8B:
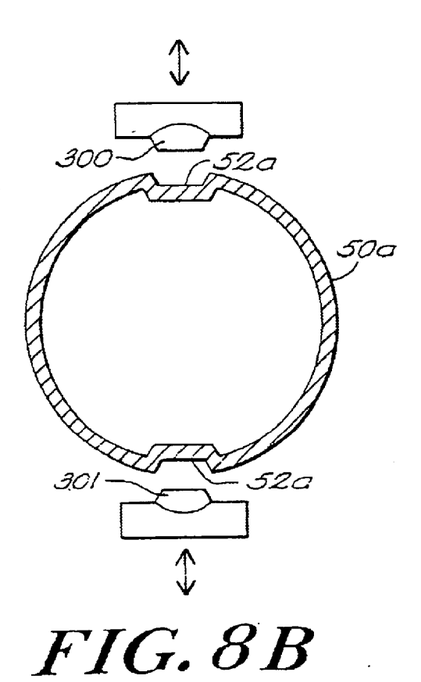
FIGS. 8B and 8C are sectional views similar to FIG. 8A showing different cartridge side wall configurations.
Figure 8C:
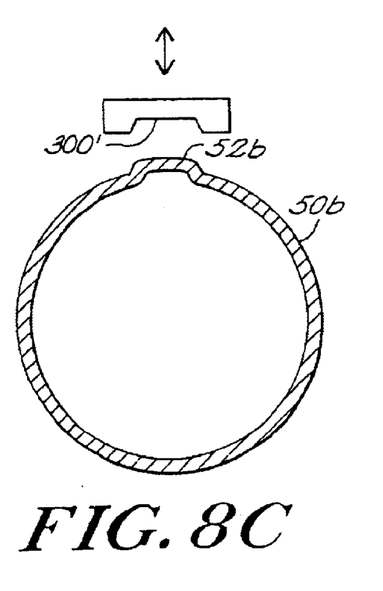

A typical beverage filter cartridge is depicted ay 50 in FIGS. 7 and 8A. The cartridge includes a cup-shaped base 51 having an inverted frustum-shaped side wall interrupted by surface irregularities indicated typically at 52 and comprising circumferentially spaced grooves. The cup-shaped base is closed by a lid 53. As herein employed, the term "surface irregularity" is intended to broadly encompass any deviation from a smooth surface than can mechanically interengage with adjacent components or surfaces of the housing 28. Non limiting examples of such surface irregularities may comprise a uniform array of grooves as shown in FIG. 8A, or pairs of oppositely disposed grooves 52a in the side wall of a cartridge 50a as shown in FIG. 8B, or a single surface irregularity such as the outwardly projecting rib 54b in the side wall of cartridge 50b as shown in FIG. 8C.

Figure 3:
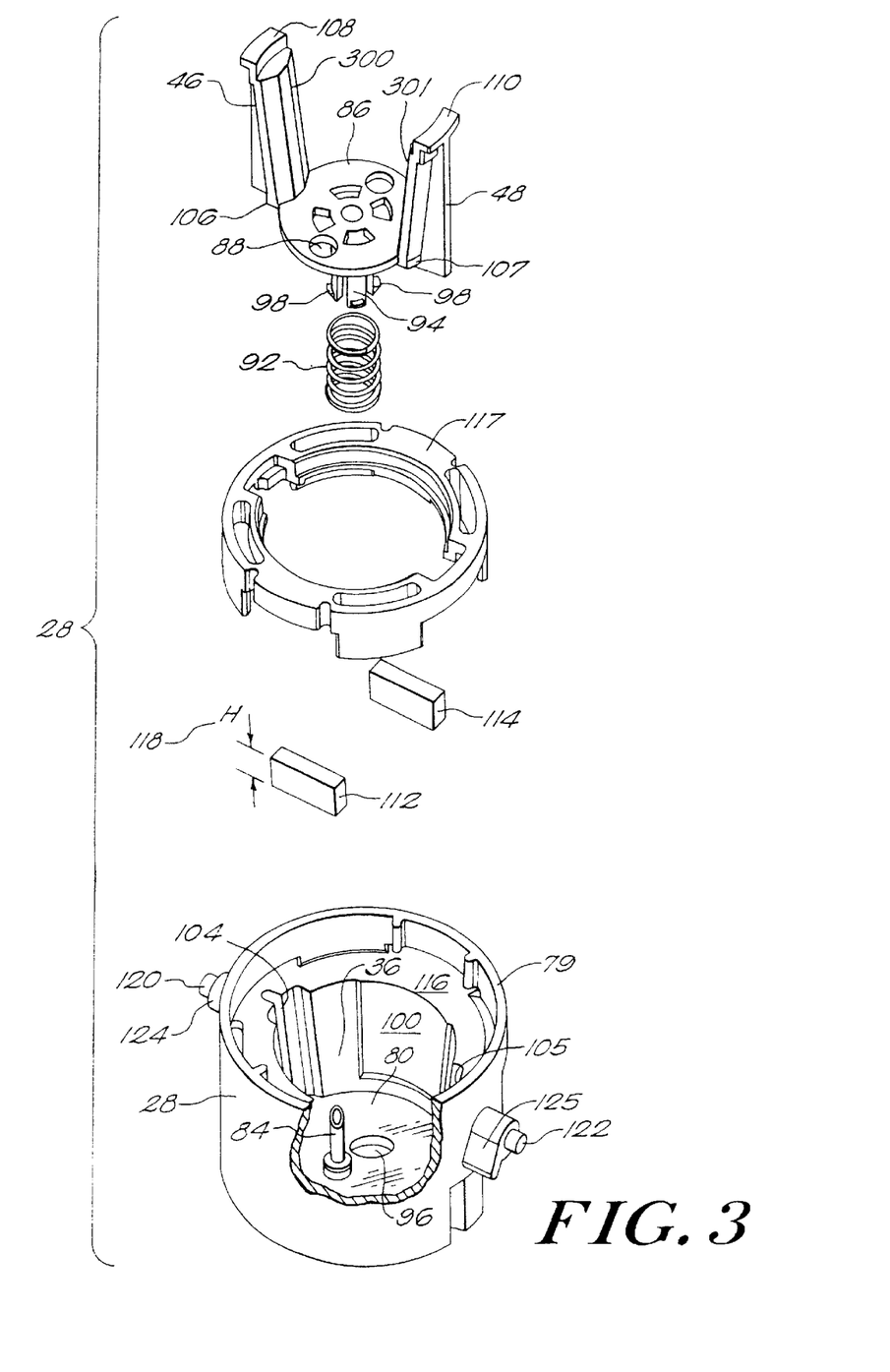
FIG. 3 is an exploded view of some of the basic components of the cartridge holder.

With reference to FIG. 3, it will be seen that the housing 28 has a circular bottom 80 through which protrudes an upwardly extending hollow exit probe 84. A slidable cartridge platform 86 has a bore 88 aligned with the upwardly extending probe 84. The cartridge ejection arms 46, 48 project upwardly from and are formed integrally with the cartridge platform 86.

A spring 92 is interposed between the housing bottom 80 and the slidable cartridge platform 86. Depending latch members 94 on to the slidable cartridge platform 86 pass through the spring 92 and through an opening 96 centered in the housing bottom 80. The latch members 94 include radially projecting teeth 98 which interengage with the edge of opening 96 to thereby limit vertical axial movement of the cartridge platform 86 with respect to the housing bottom.

The housing 28 has a side wall 100 extending upwardly from the bottom 80 to define chamber 36. The side wall 100 is configured and dimensioned to closely surround the side wall of a beverage filter cartridge 50 received in the chamber 36. The sidewall 100 includes first and second guide channels 104, 105 configured and arranged to receive the cartridge ejection arms 46, 48 respectively, allowing the slidable cartridge platform 86 to move vertically within the chamber 36. The cartridge ejection arms 46, 48 include first ends 106, 107 integrally joined to the slidable cartridge platform 86, and second end surfaces 108, 110 that are arranged to contact and support a radially outwardly protruding lip 53' of the cartridge 50. The cartridge ejection arms 46, 48 also include inwardly protruding locking ribs 300, 301 respectively that mate and interengage with the surface irregularities 52 in the side wall of the beverage filter cartridge. This feature limits rotational movement of the beverage filter cartridge within the holder, and to a limited extent, also serves to orient the cartridge within the holder. It will be seem from FIG. 8B that the cartridge side wall may alternatively be provided with only two oppositely disposed grooves 52a, each being configured to coact with a respective one of the locking ribs 300, 301 to further limit the orientation of the cartridge within the holder.

As shown in FIG. 8C, orientation can be still further limited by providing the cartridge side wall with a single surface irregularity, e.g., one outwardly projecting rib 52b arranged to coact with only a single complimentary groove 300' in one of the ejection arms, This arrangement limits the manner in which the cartridge may be inserted to a single repeatable orientation.

The holder also includes shock absorbing members 112, 114 (e.g., made of rubber) that rest on a ledge 116 of the sidewall 100 and support a compliance ring 117. The shock absorbing members 112, 114 have a height dimension 118 that positions the upper rim of the compliance ring slightly above the upper rim of housing 28 when no downward force is being applied to the ring. The function of the shock absorbing members 112, 115 and the compliance ring 117 shall be discussed hereinafter.

The housing 28 has a pair of radially outwardly extending trunnions 120, 122 that pivotally support the housing within the slidable drawer 22, and pawls 124, 125 that are used to manipulate the housing about the axis of the trunnions.

Figure 4:
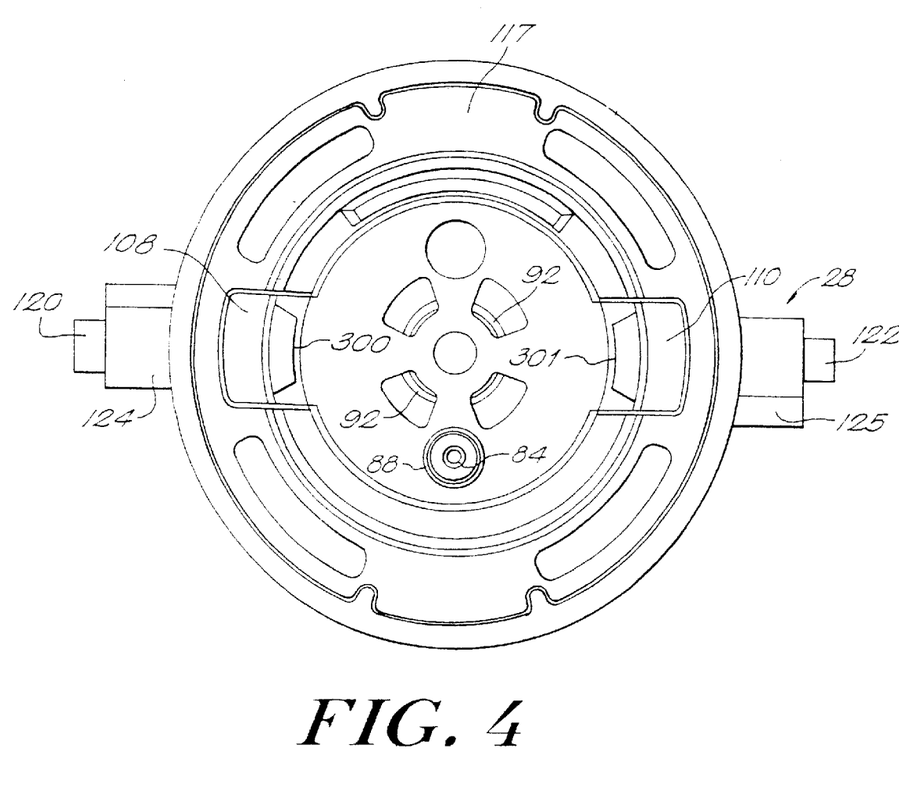
FIG. 4 is a top plan view of the cartridge holder housing.
Figure 5:
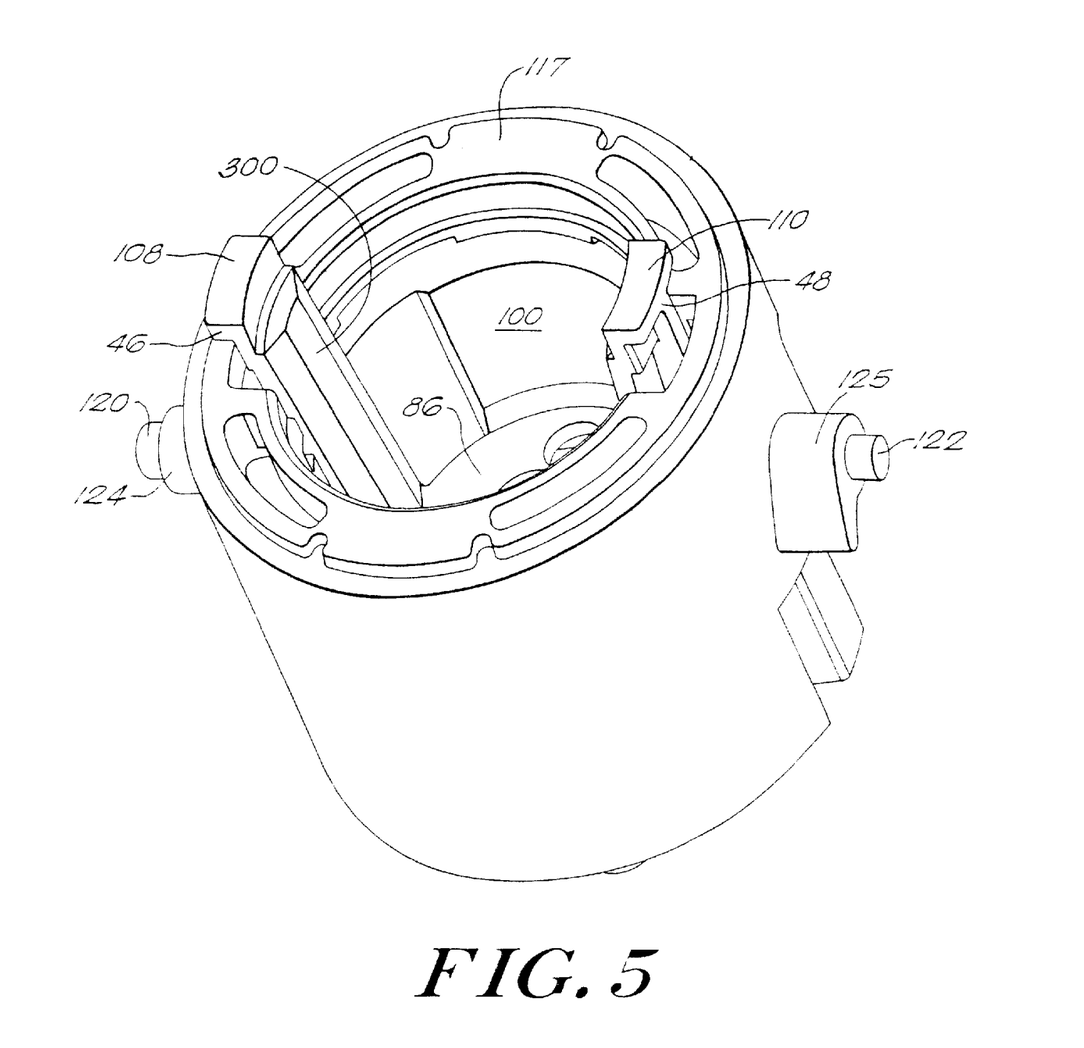
FIG. 5 is an isometric view of the housing portion of the cartridge holder.

FIGS. 4 and 5 are top plan and isometric views, respectively, showing the above described components assembled within the housing 28.

A typical brewing cycle is illustrated in FIGS. 2A–2D. Beginning with FIG. 2A, the lid 40 is elevated above the housing 28, and a cartridge 50 is received in the housing chamber 36. The lip 53' of the cartridge lid 53 is supported in the upper surfaces 108, 110 of the cartridge ejection arms 46, 48. An inlet probe 126 carried by the lid 40 is located over the cartridge lid 53.

Figure 2A:
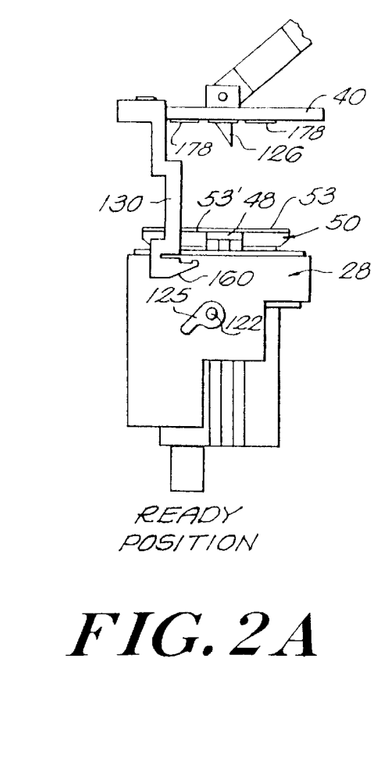
FIGS. 2A–2D are side views of the cartridge holder at successive stages during the brewing cycle.
Figure 2B:
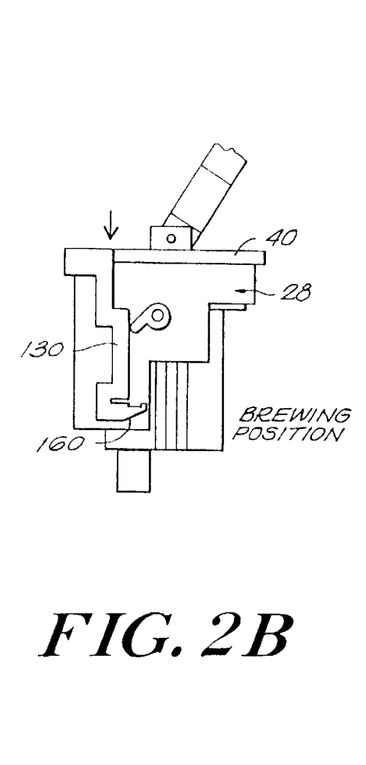

In FIG. 2B, the lid 40 has been lowered, resulting in the cartridge 50 and the cartridge platform 86 being forced downwardly against the action of spring 92. As a result, the cartridge lid and base are pierced respectively by the inlet and outlet probes 126, 84, thus accommodating a flow of heated liquid through the cartridge. The heated liquid infuses a beverage medium (not shown) contained in the cartridge to thereby produce a beverage which exits the cartridge via the outlet probe 84.

Figure 2C:
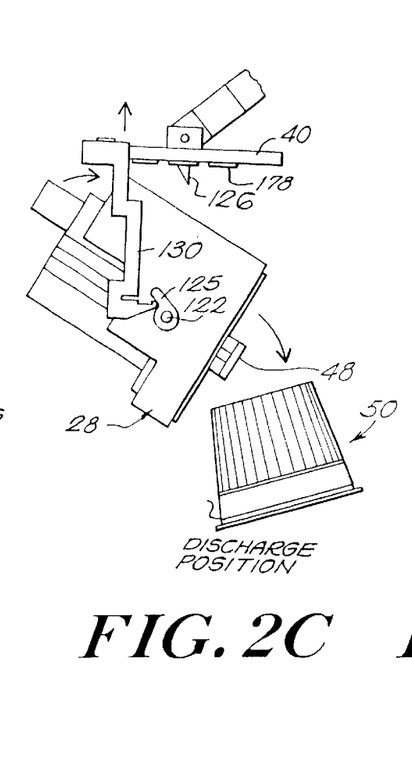
Figure 2D:
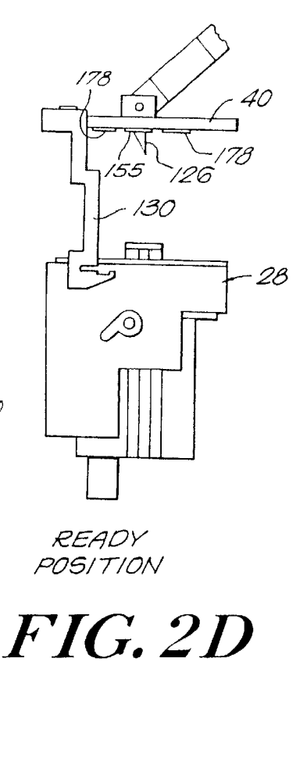

As shown in FIG. 2C, at the conclusion of the brewing cycle, the lid 40 is raised, and hooks 160 on legs 130 depending from the lid engage the pawls 125, causing the housing 28 to rotate to a discharge position at which the spent cartridge is ejected. Cartridge ejection is assisted by the spring loaded ejection arms 46, 48. The housing 28 is then returned to its original "ready" position as shown in FIG. 2D.

Figure 6:
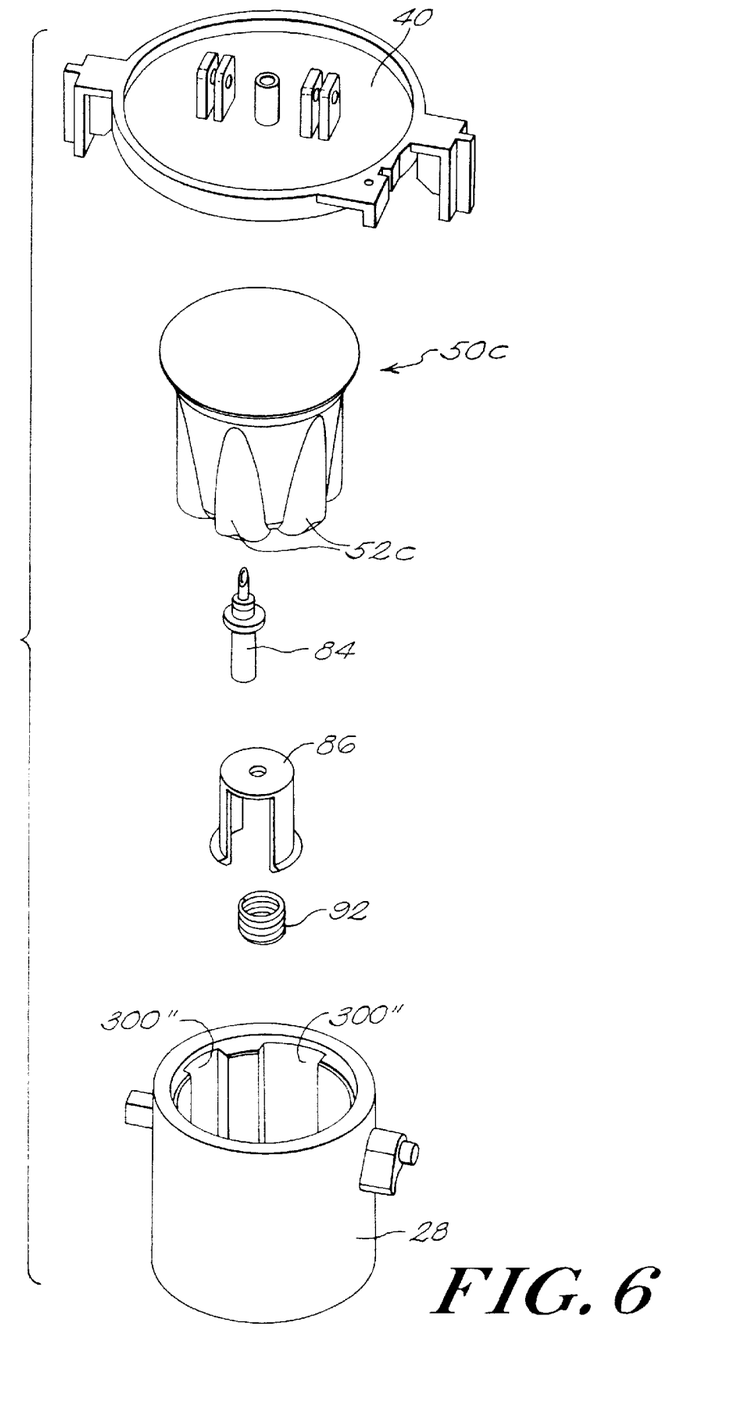
FIG. 6 is an exploded perspective view of an alternative embodiment of a cartridge holder in accordance with the present invention.
Figure 9:
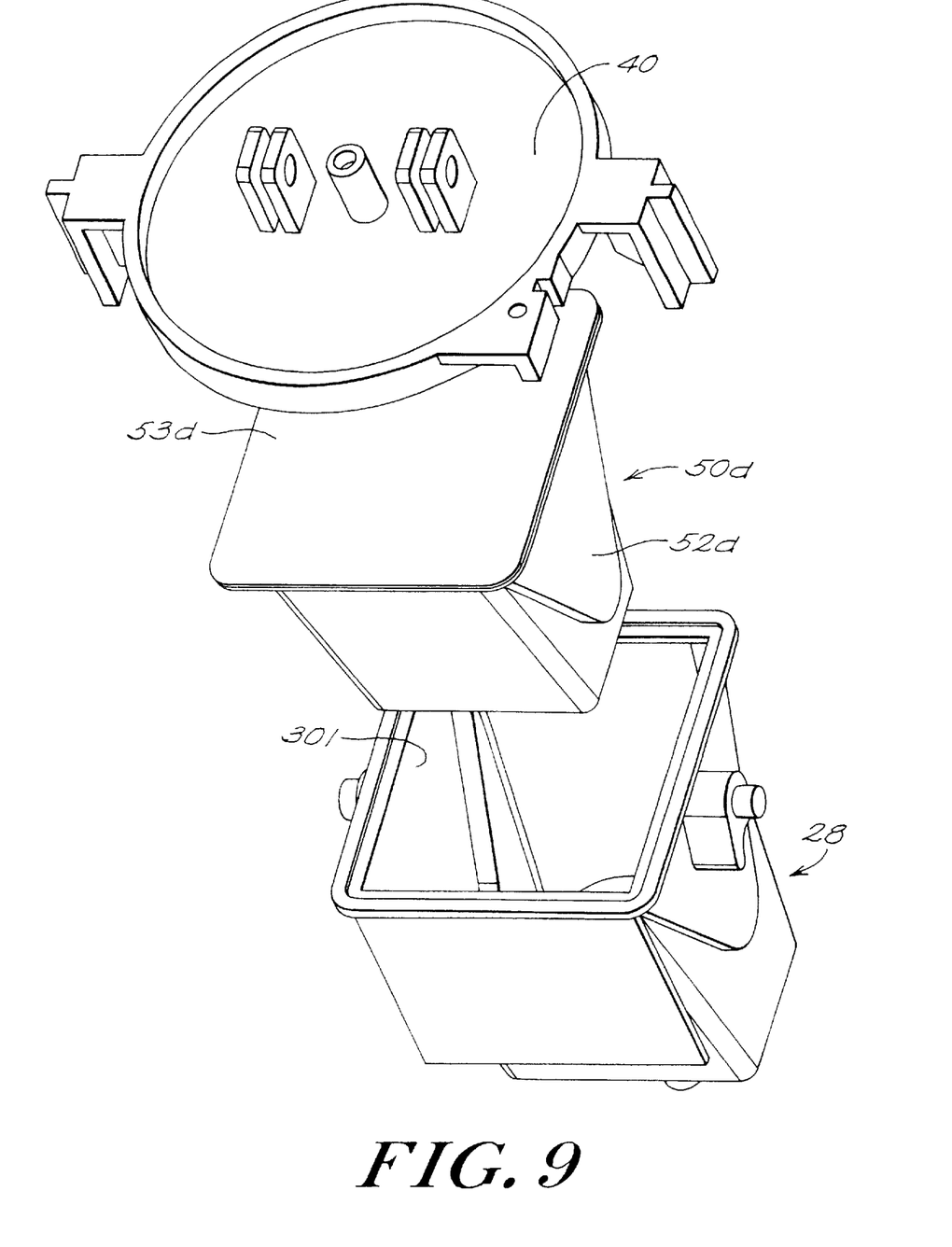
FIG. 9 is an exploded perspective view of still another embodiment of a cartridge holder in accordance with the present invention.
Figure 10:
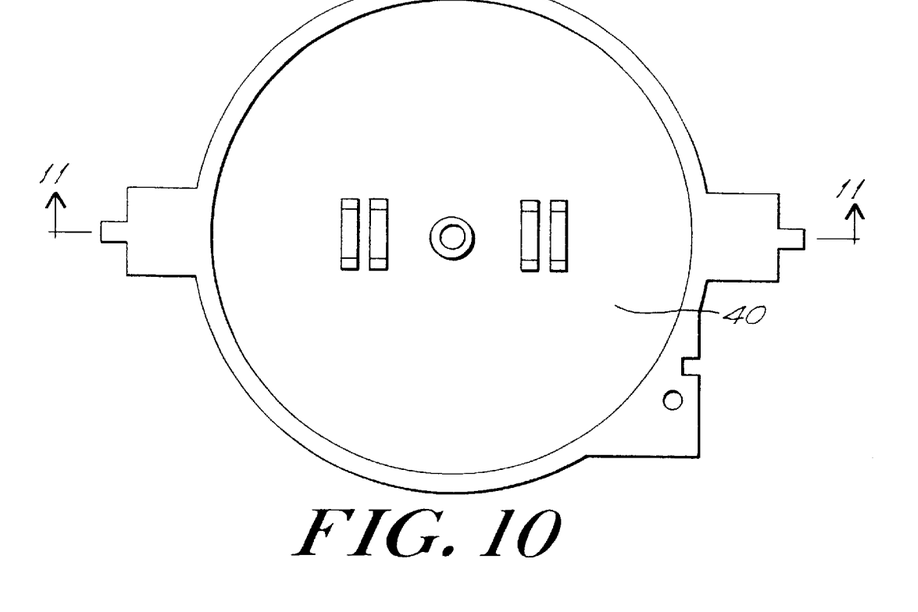
FIG. 10 is a top plan view of the cartridge holder shown in FIG. 9.
Figure 11:
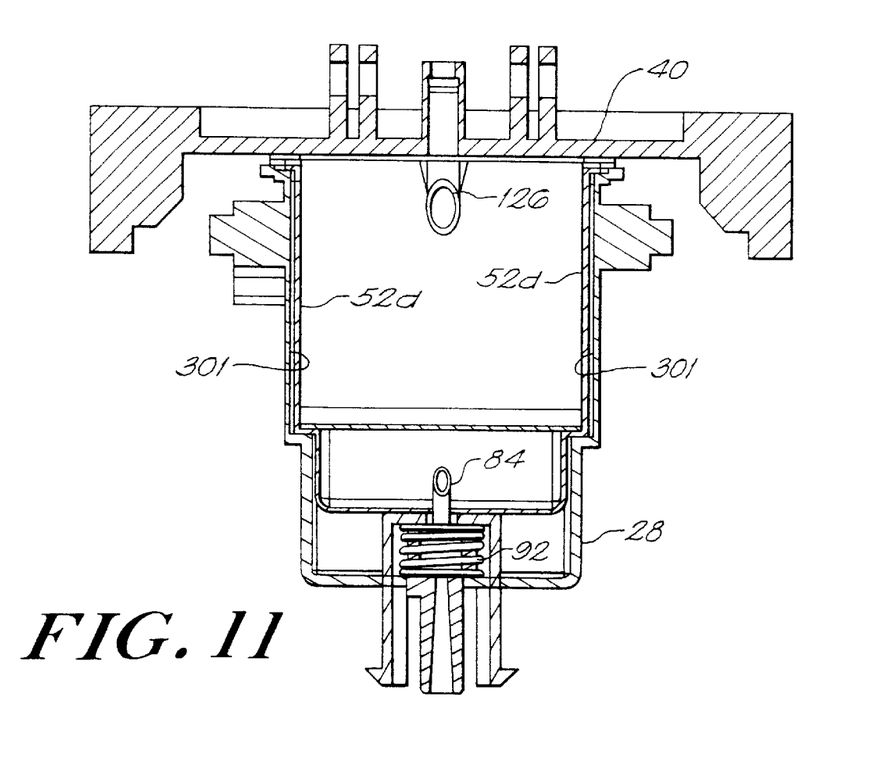
FIG. 11 is a sectional view taken along line 11—11 of FIG. 10.

FIG. 6 illustrates an alternative embodiment of a cartridge holder in which the side wall of the housing 28 is provided with internal grooves 300" configured and arranged to slidably receive and coact in mechanical interengagement with externally projecting ribs 52c in the side wall of cartridge 50c Still another embodiment of a cartridge holder is illustrated in FIGS. 9–11. The cartridge 50d is of the type described in the above-referenced patent application Ser. No. 09/782,660, with generally flat side walls diverging upwardly from a bottom to a top opening closed by a lid 53a. Oppositely facing side walls are provided with surface irregularities in the form of protruding somewhat triangular-shaped bosses 52d.

The housing 28 is similarly configured, with oppositely facing side walls provided with internal triangular-shaped recesses 301. When the cartridge 50d is received in the housing 28, and the lid 40 is closed as shown in FIG. 11, the cartridge is pushed downwardly against the biasing action of spring 92 resulting in the cartridge bottom and lid being pierced, respectively, by inlet and outlet probes 126, 84.

The recesses 301 in the housing side walls coact with the bosses 52d in the cartridge side wall to orientate the cartridge within the housing in one of two possible positions.

It is contemplated that the housings may be mounted such that they do not pivot to automatically eject the cartridges at the end of the brewing cycle, thus requiring users to manually remove the used cartridges. The holder may also employ multiple inlet probes to increase liquid distribution within the cartridge. The inlet probes also may have different heights to improve saturation of the beverage medium within the cartridge. It is also contemplated that the brewer may include a control system for automatically determining the type of cartridge (e.g., the beverage medium within the cartridge) and adjust the brewing cycle accordingly. This may include providing machine readable data such as bar codes, data matrixes, dielectric encoding, etc, on a portion of the cartridge exterior accessible to a corresponding reader in the brewer.

Although the present invention has been shown and described with respect to several preferred embodiments thereof, various changes, omissions and additions to the form and detail thereof, may be made therein, without departing from the spirit and scope of the invention.

We claim:

1. In an apparatus for brewing a beverage by infusing heated liquid with a beverage medium contained in a single serve disposable cartridge, a holder for containing said cartridge, said holder comprising:

a cup-shaped housing for removably receiving said cartridge, said housing having a side wall configured and dimensioned to surround a side wall of said cartridge;

locating means for rotabaly fixing said cartridge in said housing, said locating means comprising at least one projection in one of the side walls of said cartridge and housing, said projection being configured and dimensioned to coact in mechanical interengagement with a complimentary depression in the other of said side wall;

a lid;

means for manipulating said lid between an open position accommodating insertion of a cartridge into and removal of a cartridge from said housing, and a closed position confining a cartridge within said housing; and probe means associated with said housing and said lid for piercing a cartridge confined within said housing to accommodate a through flow of heated liquid for infusion with said beverage medium.

2. The holder as claimed in claim 1 wherein said probe means includes a tubular inlet probe carried by said lid, and a tubular outlet probe carried by said housing.

3. The holder as claimed in claim 2 further comprising ejection means shiftable with respect to the side wall of said housing for ejecting a cartridge from the housing interior.

4. The holder as claimed in claim 3 wherein said locating means comprises a part of said ejection means.

5. In an apparatus that operates during a brewing cycle to brew a beverage by combining heated liquid with a beverage medium contained in a single serve disposable cartridge, a holder for containing the cartridge during the brew cycle, said holder comprising:

a cup-shaped housing having a bottom wall and a side wall, said housing being structured and dimensioned to removably received said cartridge;

a lid for confining said cartridge within said housing;

locating means comprising at least one projection in one of the side walls of said cartridge and housing, said projection being configured and dimensioned to coact in mechanical interengagement with a complimentary depression in the other of said side walls to resist rotation of said cartridge within said housing; and means associated with said housing and said lid for piercing said cartridge to accommodate a flow of said heated liquid through said cartridge to brew said beverage by infusion with said beverage medium.

6. In an apparatus for brewing a beverage by infusing heated liquid with a beverage medium contained in a single serve disposable cartridge, a holder for containing said cartridge, said holder comprising:

a cup-shaped housing for removably receiving said cartridge, said housing having a side wall configured and dimensioned to surround the side wall of said cartridge;

locating means for coacting in interengagement with said surface irregularity to rotatably fix a cartridge received in said housing;

a lid;

means for manipulating said lid between an open position accommodating insertion of a cartridge into and removal of a cartridge from said housing, and a closed position confining a cartridge within said housing; and probe means for piercing a cartridge confined within said housing to accommodate a trhough flow of heated liquid for infusion with said beverage medium said probe means including a tubular inlet probe carried by said lid and a tubular outlet probe carried by said housing; and ejection means shiftable with respect to the side wall of said housing of ejecting a cartridge from the housing interior.

* * * * *